United States Patent
Lei et al.

(10) Patent No.: US 10,004,024 B2
(45) Date of Patent: Jun. 19, 2018

(54) METHOD AND APPARATUS FOR VARIED-HOST SHARED VEHICULAR REMOTE CONNECTIVITY

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/217,401

(22) Filed: Jul. 22, 2016

(65) Prior Publication Data

US 2018/0027476 A1    Jan. 25, 2018

(51) Int. Cl.
| | |
|---|---|
| H04B 7/00 | (2006.01) |
| H04W 40/24 | (2009.01) |
| H04L 29/08 | (2006.01) |
| H04W 40/12 | (2009.01) |

(52) U.S. Cl.
CPC ......... *H04W 40/246* (2013.01); *H04L 67/12* (2013.01); *H04W 40/12* (2013.01); *H04W 76/40* (2018.02)

(58) Field of Classification Search
CPC ..... H04W 84/18; H04W 88/06; H04W 76/02; H04W 8/005
USPC .................................. 455/41.2, 41.3, 422.1
See application file for complete search history.

(56) References Cited

U.S. PATENT DOCUMENTS

| | | | |
|---|---|---|---|
| 2010/0054154 A1* | 3/2010 | Lambert ........... | H04L 29/12311 370/254 |
| 2012/0202428 A1* | 8/2012 | Mirbaha ............... | H04L 12/185 455/41.2 |
| 2014/0233458 A1* | 8/2014 | Georgescu .......... | H04W 76/007 370/328 |
| 2014/0302774 A1 | 10/2014 | Burke et al. | |
| 2014/0362847 A1* | 12/2014 | Turunen ................. | H04W 4/06 370/338 |
| 2016/0117458 A1* | 4/2016 | Hermans ............. | G06F 19/3406 705/2 |
| 2016/0309284 A1* | 10/2016 | Lee ........................ | H04W 4/08 |
| 2016/0374104 A1* | 12/2016 | Watfa ................ | H04W 36/0011 |

FOREIGN PATENT DOCUMENTS

WO        2015019234 A1    2/2015

\* cited by examiner

*Primary Examiner* — Temica M Beamer
(74) *Attorney, Agent, or Firm* — Jennifer Stec; Brooks Kushman P.C.

(57) ABSTRACT

A system includes a processor configured to wirelessly broadcast connection credentials including host identification, responsive to a group-creation instruction. The processor is also configured to receive a request from a joining vehicle to join a group. The processor is further configured to exchange available cellular connectivity options between a group-creating vehicle and the joining vehicle. Also, the processor is configured to establish a connection with the joining vehicle. The processor is additionally configured to select a connectivity option to provide cellular connectivity for the group and instruct a vehicle corresponding to the connectivity option to serve as a connectivity-host.

6 Claims, 4 Drawing Sheets

METHOD AND APPARATUS FOR VARIED-HOST SHARED VEHICULAR REMOTE CONNECTIVITY

TECHNICAL FIELD

The illustrative embodiments generally relate to a method and apparatus for varied-host shared vehicular remote connectivity.

BACKGROUND

Vehicle manufacturers have adopted several telematics solutions in the recent past to provide connectivity options to a vehicle. One approach includes adding a cellular phone or cellular modem to a vehicle. The vehicle either uses the phone or the modem in conjunction with a cellular plan, to obtain remote communication services in the vehicle. Another approach has been to leverage a user's device plan, by wirelessly connecting to a user device and using the user device as the connectivity point. A hybrid option recently suggested includes the idea of obtaining a SIM profile from a user device, and using this SIM profile in conjunction with an on-board modem, which allows for use of advanced vehicle signal-receiving hardware in conjunction with an already established cellular plan.

In light of the preceding, it is common for a vehicle provided with telematics options to have one or two sources of connectivity. If the vehicle can leverage the connectivity provided by multiple devices in the vehicle, then even more localized connectivity options could be present, especially if the devices have different service providers. But, unless the devices in the vehicle represent all possible service providers, the vehicle is still likely to encounter areas where the signals from the available vehicle connection options are sub-optimal and/or below the signals that would be available through a different cellular carrier not represented by any in-vehicle connectivity device.

SUMMARY

In a first illustrative embodiment, a system includes a processor configured to wirelessly broadcast connection credentials including host identification, responsive to a group-creation instruction. The processor is also configured to receive a request from a joining vehicle to join a group. The processor is further configured to exchange available cellular connectivity options between a group-creating vehicle and the joining vehicle. Also, the processor is configured to establish a connection with the joining vehicle. The processor is additionally configured to select a connectivity option to provide cellular connectivity for the group and instruct a vehicle corresponding to the connectivity option to serve as a connectivity-host.

In a second illustrative embodiment, a computer-implemented method includes, selecting a cellular connectivity option associated with a signal strength above a predetermined threshold, responsive to wirelessly receiving cellular signal strength associated with a plurality of different cellular connectivity options from group vehicles connected together in a local wireless network, and instructing, over the local wireless network, a vehicle providing the selected cellular connectivity option to serve as a cellular host for the group vehicles.

In a third illustrative embodiment, a system includes a processor configured to wirelessly receive an offer and connection credentials to join a local wireless vehicle network. The processor is also configured to transmit a join request including available in-vehicle cellular connectivity options, responsive to the offer. Also, the processor is configured to receive request acceptance including a host-vehicle identifier and wirelessly connect to the host-vehicle over the local wireless network, using the connection credentials. The processor is additionally configured to route requested in-vehicle cellular communication over the wireless network to the host-vehicle for connectivity handling by the host-vehicle.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
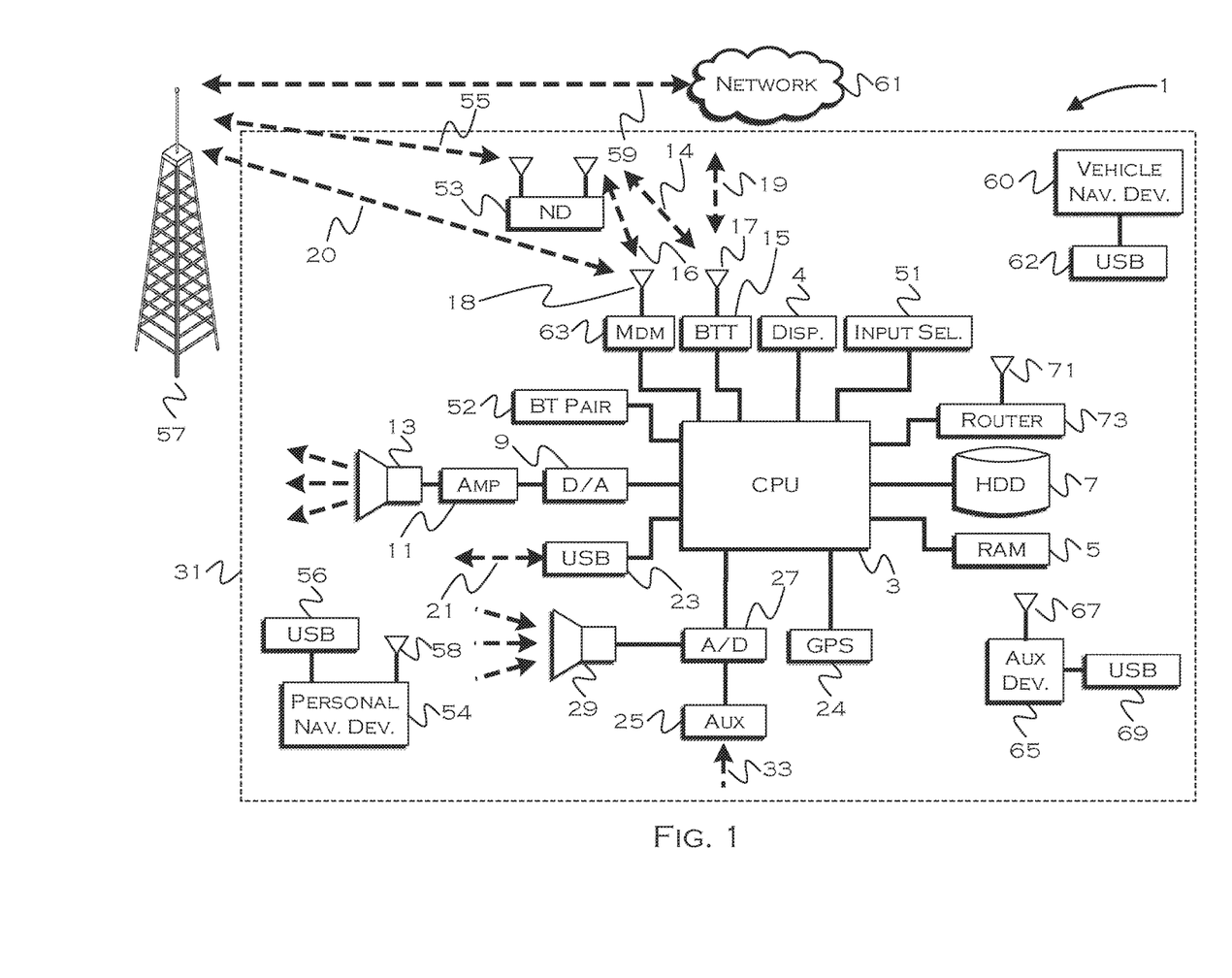
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). BLUETOOTH is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Cellular signal strength can vary wildly from device to device at a given location based on number of factors, not the least of which is the chosen cellular service provider. A typical cellular device is tied to a single provider, and thus the user of the device is subject to network coverage constraints associated with that provider.

In a vehicle equipped with a telematics control unit (TCU) and internal modem, secondary cellular provider options may exist. If the cellular provider used by the vehicle differs from a cellular provider used by an occupant wireless device, at least two cellular provider signal options may be available. These options correspond to the vehicle cellular provider and the occupant device cellular provider. If the vehicle can communicate with the wireless device to leverage the device communication capability, or use the SIM profile of the wireless device in place of the standard vehicle cellular provider, the vehicle can use either of the cellular provider options for cellular connectivity. Thus, in this scenario, the vehicle can use whichever option presents a stronger signal. If multiple occupant wireless devices are present, all with different cellular providers, the vehicle has even more options to potentially choose from.

While the above scenario of multiple wireless devices might provide three, four or five options in a fully occupied vehicle, it may also be a relatively infrequent occurrence. Since families often use the same provider for all devices, it is common that most or all wireless devices in a single vehicle share a provider. If that provider happens to be the same provider used by the vehicle modem, even a vehicle with five occupants and five wireless devices might be limited to a single cellular provider (and thus subject to any loss of signal experienced by a corresponding network at a given location).

The illustrative embodiments propose a system allowing multiple vehicles to share a cellular provider corresponding to, for example, the strongest signal available at any given location. As cellular signals change between the different provider options available to a given vehicle, the host-hopping system can designate a new "host" vehicle based on whichever vehicle can locally (between the in-vehicle option and available in-vehicle wireless devices) utilize the strongest connection. This host vehicle can then serve out internet over Wi-Fi or other suitable wireless connection, allowing the users in the member (non-host) vehicles to leverage the stronger signal and connection available to the host. Because cellular signal strength can shift as the vehicles travel, the ability of the system to switch hosts based on signal strength ensures that the group is almost always using either the strongest available connection or at least a connection above a threshold strength.

Figure 2A:
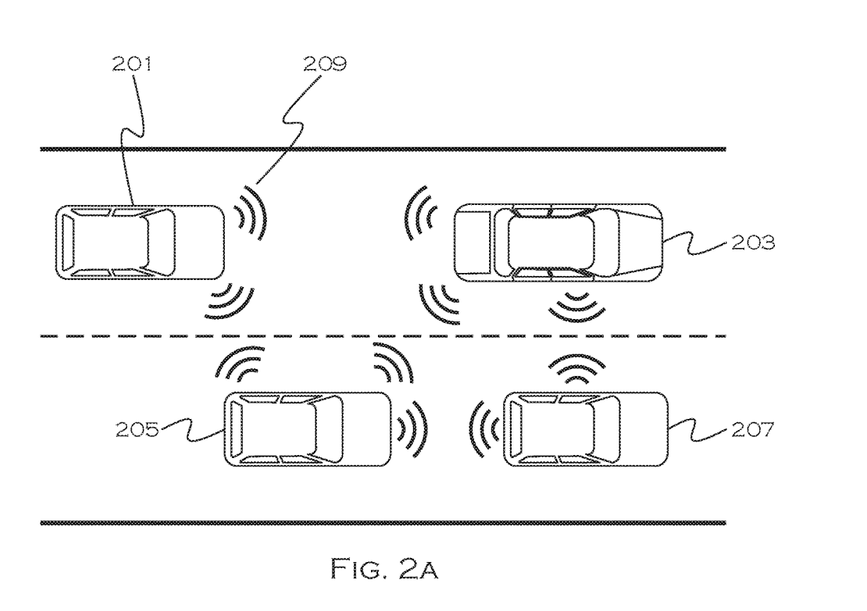
FIG. 2A illustrates a host-hopping vehicle communication system.

FIG. 2A illustrates a host-hopping vehicle communication system. In this illustration of a group of vehicles 201, 203, 205, 207 traveling down a road, each vehicle is equipped with at least local vehicle to vehicle communication 209 capability. Each vehicle will hopefully also be able to serve as a host, by providing remote cellular communication capability, but it is possible that one or more of the vehicles could lack such capability and still participate in the host-hopping group (simply never acting as a host).

Since the use of a single connection by multiple vehicles will add data-usage to the connection provider's account, this added burden can be offset in any reasonable manner. In one example, data can be "choked" by the host vehicle, allowing certain data levels to pass through, but preventing, for example, streaming a movie or downloading a large file. In another example, it may simply be assumed that over time the usage will balance out, so all participants will rely on the system averaging out data usage over time (i.e., if a user experiences 500 MB of extra data usage at one time by being a host, they will use 500 MB less of their own data at other times by virtue of other users being hosts). It is even possible that participant vehicles can "pay" for the data used, either by direct transfer of funds from one user account to another, or, for example, by providing alternate data usage (by becoming the host) if a first host reaches a threshold level of data usage. That is, the basis for switching hosts need not simply be signal strength, the host can change based on a certain host providing a threshold level of data and another suitable host option existing in another vehicle.

Since the vehicle to vehicle communication may be limited in distance, group makeup may change dynamically over time (as one vehicle leaves, another may enter). Group sizes can be capped based on total members or available cellular providers. In one example, a user is added/invited to a group based on the presence of one or more new cellular providers (not already present in the group). This can help prevent a group of five vehicles, for example, all using the same cellular provider (and thus presumably having relatively similar signal strengths available) and simply putting unnecessary data usage on a single user's account. If desired, automotive original equipment manufacturers (OEMs) can promote diversity of cellular providers by utilizing different providers in different vehicles or vehicle lines. This can help ensure that a random sampling of vehicles on the road likely has multiple carrier options, even if the vehicles are all made by the same OEM.

In the illustration, at any given time, one of the vehicles acts as a host vehicle, using an onboard cellular profile (from the modem, a wireless device, etc) to communicate with a cellular network. The vehicle also serves out local wireless connections to the other vehicles in the group, so those vehicles can connect to the host vehicle and use the cellular connectivity provided thereby.

Figure 2B:
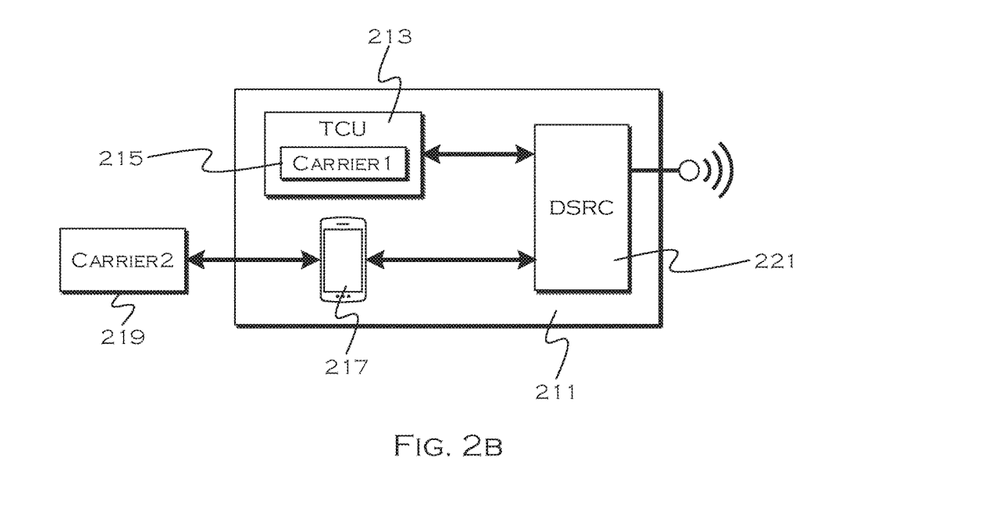
FIG. 2B illustrates a generalized system for host-hopping facilitation.

FIG. 2B illustrates a generalized system for host-hopping facilitation. This is a non-exhaustive illustration of the various connectivity options that can be provided to a given vehicle. In this example, the vehicle includes a TCU 213. A first cellular carrier 215 (CARRIER1) enables connectivity using the TCU.

Also, in this example, an occupant is carrying a wireless device 217 inside the vehicle. A second cellular carrier 219 (CARRIER2) provides connectivity to this device. Both options connect through the vehicle computer to a dedicated short range communication (DSRC) transceiver. This transceiver provides the local connectivity with other vehicles. In this example, connectivity is established through the TCU using CARRIER1 or the wireless device using CARRIER2, but it is also possible that the TCU can use the SIM profile of the wireless device and establish connectivity through the TCU using CARRIER2. In a network of vehicles, if a different vehicle acts as a host, then the local connectivity options for a member vehicle may not be utilized unless that vehicle switches to being a host.

Figure 3:
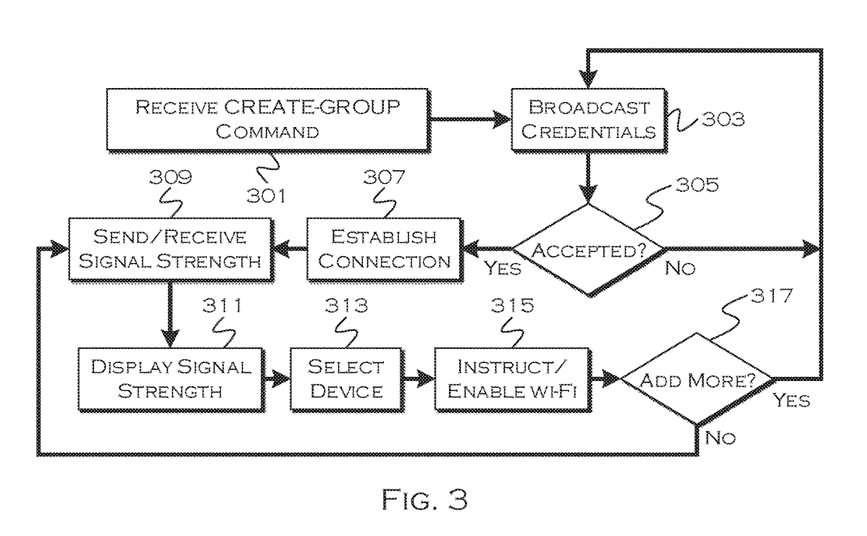
FIG. 3 illustrates a process flow for host-hopping group creation in a host vehicle.

FIG. 3 illustrates a process flow for host-hopping group creation in a host vehicle. In this example, one vehicle driver initiates group formation, although group creation could also be actively and dynamically managed by a remote server (which can know the carriers available to each vehicle and vehicle locations, and group up vehicles accordingly to semi-optimize carrier-availability to each group).

In this example, the process receives a command or request from a driver or vehicle occupant to create a group. As noted, group creation can also be automatic or responsive to a condition such as drop or loss of currently available signals.

In this example, the vehicle broadcasts a set of credentials 303 in response to the create group initiation. It is also possible that a driver explicitly specifies vehicles for invitation to the group. In the latter instance, the driver may have a pre-saved list of favorite vehicles or family and friend vehicles. If the vehicles are traveling in a group, the driver could invite the group, invite specific vehicles, or initiate a request to find all locally present "known" vehicles and invite them. The example shown is a more generalized invitation process, whereby the vehicle announces itself to proximate other vehicles. The invitation to group-up can include the provider(s) currently available to the group-host (initiating) vehicle, which can be used by the selection process in other vehicles to determine if grouping is appropriate. Other credentials can also be included, such as key-sharing for creating an adhoc network between the group vehicles (using DSRC, other Wi-Fi, or other localized wireless communication).

If one or more vehicles accept the invitation to join the group 305, the group-host establishes communication between the new vehicle and the group-host 307. This can involve an exchange of connection credentials. The group host may also vet the accepting vehicle, if, for example, group joining is limited to vehicles having a new cellular service provider not currently present. Assuming the request-accepting vehicle is suitable, the group-host will add the vehicle to the group.

Since vehicles move in an out of contact with each other, all the vehicles in the group can function as an ad-hoc mesh network, and if the original group host moves out of range, a new vehicle can adapt to become the group host. Generally speaking, the group-control capabilities of the host may be limited, but since the host may perform one or more functions relating to host selection, it may be useful to have a persistently defined host vehicle, even if that vehicle changes.

Once a vehicle joins the group, the signal strength of the available providers of the host, any other group vehicles and the new vehicle are shared 309, with each vehicle identifying its respective signal strengths, for example. This allows each driver to see the relative signal strengths of the available networks displayed 311 on a vehicle human machine interface (HMI), when an HMI is available. Typically, the host will select the strongest available network for usage, but this can be subject to some constraints as will be seen in the FIG. 5 example. This sharing could also include identification of how much data has been handled by each connection on behalf of the groups. Each individual vehicle may track data handling with respect to the amount of data transferred over the Wi-Fi connection (while the vehicle is serving as a host) when a given local cellular connection is being utilized. Vehicles may also employ other data usage tracking. Member vehicles can also share either or both of these data elements periodically at intervals or when thresholds are reached (high data use, cellular signal above or below threshold).

In this example, the host selects the network with the strongest coverage 313 and sends an instruction to the vehicle controlling connection to this network 315. The instruction tells the vehicle to utilize the identified network and to provide Wi-Fi, DSRC or other connectivity credentials for the group vehicles to utilize the cellular connection. If the host vehicle currently contains the strongest network providing device, then the host will engage this connection and send out the appropriate connection credentials 315.

At any given time there may be multiple available networks with suitable signal strength available. To avoid consistently switching connectivity-host vehicles to the literal strongest signal, the group-host vehicle may utilize a currently-utilized network for some period of time or until a certain amount of data has been transferred over the network. This allows the group to share the workload without unnecessary switching of connectivity-hosts. If the current connectivity host signal drops below a threshold strength (or meets other criteria for a switch, examples of which are provided with respect to FIG. 5), the process can move to a new host.

Also, in this example, the group-host decides if the group is full. In order to limit the data usage burden placed on any one device's cellular plan, the group-host may limit the size of the group based on predefined criteria. This can be useful to avoid a large multi-vehicle network all streaming data through a single vehicle device.

Figure 4:
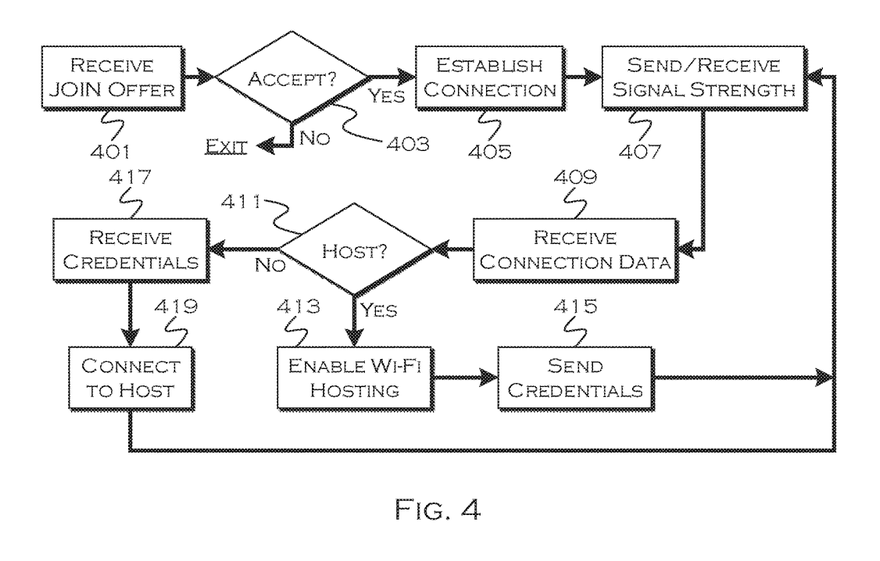
FIG. 4 illustrates a process flow for host-hopping group participation in a group-member vehicle.

FIG. 4 illustrates a process flow for host-hopping group participation in a group-member vehicle. In this example, the vehicle is an invitee that receives an offer to join a group-host vehicle in a cellular connectivity sharing group. The receiving vehicle can consider the received credentials received with the broadcast of the group-host invitation, to determine if joining this particular group is appropriate. A user may not wish to join for a variety of reasons, such as too large of a group or a group whose available networks mirror the receiving vehicles. In other examples, the group-host may broadcast a set of criteria required for joining, and the receiving vehicle may not meet this criteria.

If the join offer is accepted (explicitly by a driver or automatically by a vehicle, which a driver can configure based on predefined settings), the new group member may establish a connection 405 with the host vehicle based on received or exchanged (at the time of acceptance) credentials. The vehicle will send its connection capabilities 407, including the signal strengths of available onboard networks. The vehicle can send this to the group-host for distribution or to all of the vehicles in the group. At the same time, the vehicle will receive 407 the signal strengths of the other group vehicles, so that the driver of the new group member vehicle can see a displayed list of the relative signal strengths of the available networks.

Displaying the relative signal strengths may be especially useful if the group is comprised of random strangers and the group-host has manual selection capability of a network. To prevent a group-host from abusing selection capability, other drivers can see the relative network strengths and which network is currently in use. This can help a driver identify if their own network is being inappropriately over-used, and they can subsequently exit the group. This is less of a problem if the selection is automatic, but if the host can manually override the network selection the opportunity exists for abuse.

The vehicle also receives connection data for establishing the local communication with other group vehicles 409. This can include encryption keys, addresses and any other credentials needed to communicate with some or all vehicles in the group.

Once the group-host has selected a connectivity-host, the group member will receive indicia indicating whether or not it is currently designated as the connectivity-host 411. If the group member is the current host, it receives instructions to enable Wi-Fi hosting 413. This includes instructions to utilize a particular available cellular connection (if more than one connection is available) and to send out connection credentials so that the new group member vehicle can act as a host for the other group members. If needed, the connectivity-host (the new group member designated as a host) can send out connection credentials to any group members not currently connected to the connectivity-host 415.

If the new group member is not currently the host, it can instead receive any needed credentials to utilize whichever vehicle is currently the connectivity-host 417. At this point, it can connect to the connectivity-host and utilize the connection provided by the host.

The sending of signal strengths continues at intervals while the group progresses along the road. Connectivity-host switching can thus occur based on which vehicle currently provides an optimal signal (and/or subject to constraints similar to those discussed with respect to FIG. 5).

Figure 5:
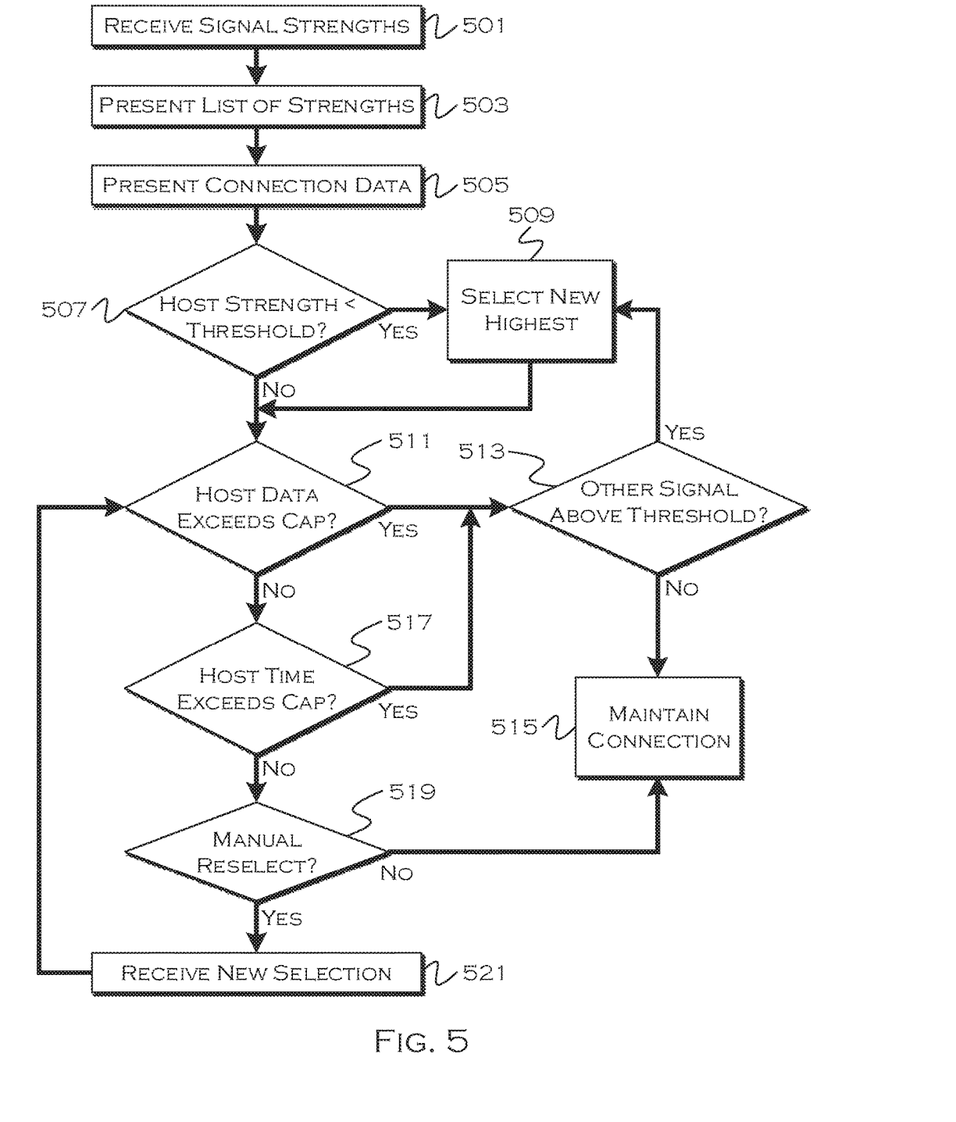
FIG. 5 illustrates a host-selection process.

FIG. 5 illustrates a host-selection process. In this example, the process executes on the group host vehicle. While all group members could vote on which vehicle's connectivity to use, this process is one example of consolidating the decision in a group-host vehicle.

The group-host vehicle (the group-creating vehicle) receives the signal strengths of all signals available to all vehicles in a group 501. The vehicle presents this data to the group-host vehicle occupants in an ordered list 503 based on signal strength. This allows quick and easy identification of the strongest signal. If certain signals/vehicles/networks have been over-utilized (if there are time or data transfer caps), those signals may be removed from the list unless they are the only signals suitable for utilization (above a useful threshold) at a given time. This helps share the load between various users.

The vehicle also presents the connection data for a current connection, assuming one has been established 505. This data can include, for example, duration of connection, data transferred over connection, signal strength, and any other data that may be useful in determining whether or not to switch connectivity-hosts. In this example, the switching is automatically done by the group-host vehicle, unless manual override is selected. Also, in this example, even the manual override is subjected to overuse constraints, to prevent abuse of a single user.

If the current connectivity-host connection signal strength is below a predefined useful threshold 507, the process will select a new host signal/vehicle 509. This will initially, in this example, be the current strongest signal available. To avoid overtaxing a single device, this process also determines if the newly selected host is a reasonable and fair selection, if multiple host options exist.

If the new host data usage exceeds a predefined data cap 511, or if the current host signal is strong enough to persist as the host, but the data usage exceeds the predefined cap 511, the process determines if another possible host signal exists 513 above the useful threshold.

If there is an alternative usable host, the process switches to that host and again checks the data cap. Any previously utilized hosts may be removed from consideration at this time, to prevent repetitive swapping between multiple hosts which have all exceeded the data cap, but which also represent the only usable signals. If there is no suitable alternative host option remaining, the process will maintain use of the selected host 515 (that being the only remaining reasonable option).

If the selected or current host data usage does not exceed the data cap, the process may also determine if the signal has been used for too much time 517. This is probably less important to most people than the data usage, since very few cellular providers, if any, care how much time a device is connected, as long as data is not being utilized. Time is presented here as an example of how additional constraints can be considered to keep the sharing process fair between unfamiliar users. As with the data cap, if there are other suitable signal options, the process will switch to a new signal. If there are not any suitable alternatives, the process will maintain the current connectivity host.

This process also provides an option for manual selection of a signal for use as a connectivity-host. If the driver of the group-host vehicle elects to manually select a signal 519, the process receives manual selection of the new signal 521 and performs the same data and time checks against this signal. This helps prevent abuse from a driver who manually selects signals other than his own for use by the group. In other alternatives, the group can vote on which signal to use, or data use may be throttled to a certain extent so that participants do not really care which signal is selected.

Through the illustrative examples, it is possible to achieve dynamic network creation for the purpose of sharing cellular connections which vary in strength over a trip. Balancing can be employed to keep things fair and to encourage participation between otherwise unknown participants. Since different carriers have different signal strengths at any given location, long term use of the system will probably fairly share data loads, even if balancing is limited or not utilized. By allowing the signal sharing between group members, stronger and better connectivity options can be achieved over the duration of a journey, in a reasonably equal exchange of burdens between unfamiliar drivers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
wirelessly broadcast connection credentials including host identification, responsive to a group-creation instruction;
select a connectivity option, from available connectivity options provided by each vehicle of a group established by the group-creation instruction, to provide cellular connectivity, for the group, based on an amount of group data already transferred by each of the connectivity options; and
set a connectivity-host to a vehicle corresponding to the selected connectivity option.

2. The system of claim 1, wherein the host identification identifies a group-creating vehicle as the host.

3. The system of claim 1, wherein the host identification identifies a member vehicle already grouped with a group-creating vehicle as the host.

4. The system of claim 1, wherein the processor is configured to select the connectivity option corresponding to a connectivity option having a highest signal strength, which has not already transferred a predetermined threshold amount of data.

5. The system of claim 1, wherein the processor receives aggregate amounts of group data already transferred by each of the connectivity options from vehicles participating in the group.

6. A computer-implemented method comprising:
responsive to wirelessly receiving cellular signal strength associated with a plurality of different cellular connectivity options from a group of vehicles connected together in a local wireless network, selecting a cellular connectivity option both associated with a signal strength above a predetermined threshold and which has also not yet handled cellular transfer of at least a predefined threshold amount of data; and
instructing, over the local wireless network, a vehicle providing the selected cellular connectivity option to serve as a cellular host for the group vehicles.

* * * * *